United States Patent [19]

Mukhamedyarov et al.

[11] 4,115,272
[45] Sep. 19, 1978

[54] APPARATUS FOR SEPARATION OF CHEMICAL COMPOUNDS AND PRODUCTION OF STERILE SOLUTIONS

[76] Inventors: Rashid Mustafievich Mukhamedyarov, ulitsa Kasatkina,3; Boris Andreevich Smirnov, ulitsa Borisa Galushkina, 17, kv. 26; Stanislav Vasilievich Sery, ulitsa Malaya Schukinskaya, 10a, kv. 42; Tatyana Dmitrievna Titkova, ulitsa Festivalnaya, 22, korpus 4, kv. 490; Anatoly Ivanovich Lokalov, ulitsa Gamalei, 19, korpus 2, kv. 81, all of Moscow, U.S.S.R.

[21] Appl. No.: 754,563

[22] Filed: Dec. 27, 1976

[30] Foreign Application Priority Data

Dec. 31, 1975 [SU] U.S.S.R. .............................. 2306714

[51] Int. Cl.² .............................................. B01J 1/06
[52] U.S. Cl. ..................... 210/266; 210/282; 251/354
[58] Field of Search ................ 210/266, 282; 251/349, 251/350, 353, 354

[56] References Cited

U.S. PATENT DOCUMENTS

| 2,283,970 | 5/1942 | Buttner ................................ 251/350 |
| 3,063,462 | 11/1962 | Potash ................................. 251/353 |
| 3,471,261 | 10/1969 | Patterson ............................ 210/282 |
| 3,595,397 | 7/1971 | Abos ................................... 210/266 |
| 3,909,402 | 9/1975 | Gartner ............................... 210/266 |

*Primary Examiner*—Charles N. Hart
*Assistant Examiner*—Ivars Cintins
*Attorney, Agent, or Firm*—Lackenbach, Lilling & Siegel

[57] ABSTRACT

An apparatus for separation of chemical substances and production of sterile solutions, which comprises a column closed with plugs at the ends thereof and containing an ion-exchange agent and at least one filter. In the body of each plug there is a piercing duct with an inner expansion chamber wherein a resilient stopper is placed, which stopper is provided with longitudinal notches at its external surface extending over the end surface of the stopper facing the column so that said longitudinal notches communicate with the piercing duct of the plug. At the opposite end of the stopper there is a closing cone abutting with its surface upon the edges of the end portion of the piercing duct thus ensuring tight sealing of the latter. Each of the plugs is provided with a cover adapted to be attached to a vessel for solutions and having an inner hollow pressure rod passing through the end portion of the piercing duct of the plug and activating, by its end, the closing cone of the stopper so that upon putting the cover on the plug the stopper is compressed by the rod and the piercing duct of the plug becomes open for the flow of solutions.

2 Claims, 4 Drawing Figures

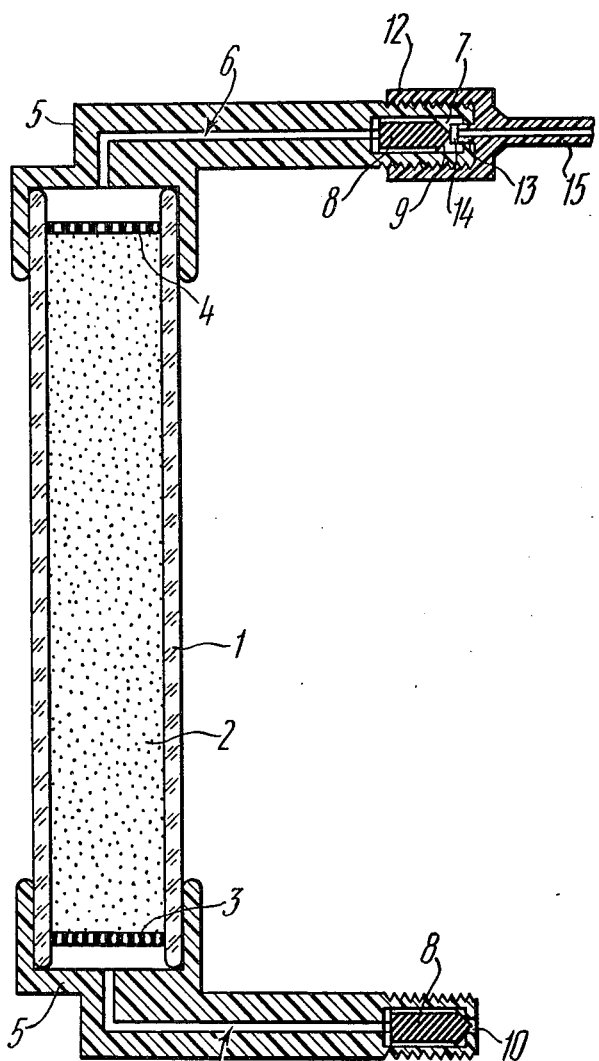
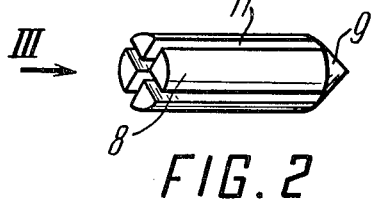
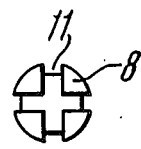
FIG. 1
FIG. 2   FIG. 3

APPARATUS FOR SEPARATION OF CHEMICAL COMPOUNDS AND PRODUCTION OF STERILE SOLUTIONS

The present invention relates to the art of separation of chemical substances and, more specifically, to apparatus ensuring production of sterile solutions upon separation of chemical substances; it is useful, for example, for separation of high-molecular compounds of chemical elements while retaining sterility of the solutions employed.

Known in the art are various arrangements of apparatus for separation of chemical substances with the production of sterile solutions.

In the prior art arrangements it comprises a glass reservoir, i.e., a column with placed thereinside an ion-exchange agent and a filter. The column is sealed, for the purpose of sterility, with rubber plugs with rolling-in by means of an aluminum foil. Upon the use of said prior art apparatus, it is necessary to puncture the plugs with injection needles to feed a solution into the column and to take the product therefrom after its passing through the ion-exchange agent and filter.

However, in the prior art apparatus, the above-mentioned repeated puncture of plugs substantially increases the probability of losing tightness of the apparatus due to ruptures and cuts in the rubber plug caused by the needle which is intolerable for the apparatus adapted for the production of sterile products. The use of acid solutions in such apparatus causes corrosion of the needle metal which substantially lowers the quality of the resulting product. Furthermore, sealing of the column at both ends by means of rubber plugs with aluminum rolling-in causes the necessity of making columns of a sophisticated configuration with special rims for the plug edges and rolling-in. It is especially inconvenient in the case of manufacturing apparatus adapted for separation of radioactive substances, since it is performed in a restricted space of protective chambers, and aggravated by the necessity of having special means for rolling-in of aluminum caps in such chambers.

It is an object of the present invention to provide a novel air-tight arrangement of an apparatus for the production of sterile solutions which retains its seal and enables repeated use for the production of a sterile product without danger of contamination from dopes of foreign metals which is ensured by eliminating metal parts from the communication system, and which would be technologically simple to manufacture and operate.

This object is accomplished by an apparatus for separation of chemical substances with the production of sterile solutions involving a column closed with plugs at the ends thereof and containing an ion-exchange agent and at least one filter. In accordance with the present invention, in the body of each plug there is a piercing duct with an inner expansion chamber, wherein a resilient stopper is placed; the length of this stopper in its free extended state excceds the length of said expansion chamber; the stopper also has longitudinal notches at the external surface thereof which extend over the end surface of the stopper facing the column so that the longitudinal notches communicate with the piercing duct of the plug; at the opposite end of the stopper there is a closing cone abutting, with its surface, upon the edges of the end portion of the piercing duct of the plug thus ensuring tightness of said piercing duct, and each of the plugs is provided with a cover adapted to be attached to a vessel for solutions and having an inner hollow pressure rod with a longitudinal slit at its end which rod passes through the end portion of the plug duct and activates, with its end, the closing cone of the stopper in such a manner that upon putting-on of the cover the stopper is compressed by said rod and the piercing duct becomes open for flowing of solutions.

The apparatus according to the present invention ensures complete tightness of the system for a long service life. The column arrangement is substantially simplified as compared to the prior art apparatus due to elimination of the necessity of the column rolling-in. This, in turn, makes it possible to avoid the use of a special equipment for sealing of the column, since such sealing in the apparatus according to the present invention is effected by simply pushing the plug up to the stop.

As a result, the use of the apparatus according to the present invention ensures, as compared to the prior art apparatus, a better quality of the resulting product owing to the absence of metal parts in the communication system.

The apparatus for separation of chemical substances and production of sterile solutions is rather simple and reliable in operation and can be used in laboratories, for medical applications as well as for other special purposes in industry.

The present invention will now become more fully apparent from the following detailed description of examples of its embodiments with reference to the accompanying drawings, wherein:

FIG. 1 shows an apparatus for separation of chemical substances with the production of sterile solutions according to the present invention, in its working condition; side elevation;

FIG. 2 is an enlarged view of the resilient stopper according to the present invention;

FIG. 3 is a view in the direction of arrow III in FIG. 2;

Figure 4:
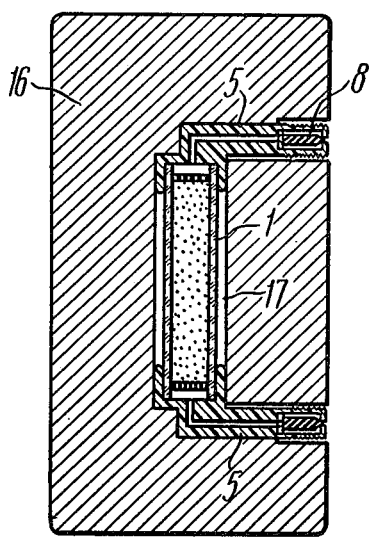
FIG. 4 is an elevation view of the apparatus according to the present invention for separation of radioactive substances in a protective container for storage or transporation.

The apparatus for separation of chemical substances and production of sterile solutions according to the present invention includes a column 1 (FIG. 1) filled with an ion-exchange agent 2. In the lower section of the column there is mounted a filter 3 for retaining solid particles of the ion-exchange agent 2. In the upper section of the column 1 a filter 4 can be provided over the layers of the ion-exchange agent 2 which filter is adapted for filtration of bacterial media or for securing of the ion-exchange agent 2.

The column 1 is closed, at the ends thereof, with identical plugs 5 provided with piercing ducts 6 for passing solutions and having, at their end portions, an inner expansion chamber 7 adapted for placing therein a resilient stopper 8 with a closing cone 9 (FIG. 2). Diameter of the resilient stopper 8 is the same as the diameter of the inner expansion chamber 7 (FIG. 1) and its length in a loose condition exceeds the length of the inner expansion 7. Therefore, the resilient stopper 8 placed inside the inner expansion chamber 7 abuts with its closing cone 9 (FIG. 2) upon the edges of the end portion 10 of the piercing duct 6 just like in the lower plug 5 shown in FIG. 1 thus ensuring tight sealing of the piercing duct 6 and maintaining the apparatus sterility for separation of chemical substances according to the present invention in the condition of storage or upon transportation.

At the external surface of said resilient stopper 8 there are longitudinal notches 11 (FIGS. 2 and 3) which extend over the end surface of the stopper 8 facing the column 11 (FIG. 1) so that these notches 11 (FIG. 2) communicate with the piercing duct 6 (FIG. 1) of the plug 5.

During operation of the apparatus according to the present invention, each plug 5 is provided with two covers 12 (shown in FIG. 1 is a single cover 12) with an inner hollow pressure rod 13 provided with a transverse slit 14 at the end face thereof.

The cover 12 is adapted for being attached to a vessel for solutions (not shown). To this end, it communicates to a flexible hose 15 serving for connection of said vessel for solutions with the hollow rod 13.

When the cover 12 is screwed upon the plug 5 up to the stop as shown in FIG. 1, the hollow pressure rod 13 activates the closing cone of the resilient stopper 8 and compresses it so that the closing cone 9 is moved out of the end portion 10 of the piercing duct 6 of the plug 5. Therewith, the piercing duct 6 of the plug 5 becomes opened so that notches 11 (FIG. 2) on the resilient stopper and the notch 14 (FIG. 1) on the pressure rod 13 of the cover 12 set the column 1 in communication with the vessel for solutions.

The plugs 5 can be made so that their piercing duct 6 is located coaxially with the column 1 (not shown) or bent at an angle to the column axis as shown in FIG. 1. The plug 5 shape depends on specific conditions of the apparatus application.

An embodiment of the plug 5 as shown in FIG. 1 is preferable for the apparatus employed for separation of radioactive substances.

The shape of the plug 5 makes it possible to place the apparatus for separation of chemical substances into a protective container 16 (FIG. 4) having a cavity 17 corresponding to the apparatus configuration and a sealing plug 18 of the container 16 enabling convenient connection of the vessel for solutions by means of covers 12 (FIG. 1) with hoses 15 but on the plugs 5 thus ensuring a complete protection against an ionizing radiation due to the absence of piercing ducts or slits in the closed container 16.

Operation of the apparatus according to the present invention for separation of chemical substances with the production of sterile solutions is effected in the following manner.

A vessel with a sterile solution (not shown) connected to a flexible hose 15, is communicated, by means of a sterile cover 12, with the upper plug 5 and the vessel for sampling a solution of the separated substance is connected, by means of other sterile cover 12 (not shown) to the lower plug 5. Therewith, upon screwing-on of the covers 12 the closing cones 9 of the resilient stoppers 8 are pressed-out, wherefore the apparatus becomes hermetically connected with said vessels. A sterile solution is fed into the column 1 through the upper plug 5 and then it successively passes through the ion-exchange agent 2 and filter 3, while through the lower plug 5 the sterile solution of the separated compound is collected.

In the case where a non-sterile solution is fed into the apparatus, a bactericidal filter 4 is mounted in the column 1 over the layer of the ion-exchange agent 2, wherefore a sterile solution of the separated compound can be collected through the lower plug 5.

After collection of a particular amount of the separated substance, covers 12 can be removed; in doing so, the closing cones 9 of the resilient stopper 8, while abutting upon the edges of the end portions of the piercing ducts 6 of the plugs 5 will again ensure tight sealing of the piercing ducts 6 and, hence, sterility of the apparatus.

What is claimed is:

1. An apparatus for the separation of chemical substances and the production of sterile solutions which comprises a column, an ion exchange agent placed into said column; at least one filter in said column; plugs closing said column at the ends thereof; the body of each plug containing a piercing duct having an inner expansion chamber; a resilient stopper placed in each of said expansion chambers whose free extended length exceeds the length of said expansion chamber, and where each resilient stopper has longitudinal notches on its external surface extending over the stopper end facing said column so that said longitudinal notches communicate with the piercing duct; a closing cone on each stopper provided on an end opposite to its notched end engaging the edges of the end portion of said piercing duct of the plug; said cone being located in said expansion chamber in a direction away from said column thus ensuring a tight seal for the piercing duct; a cover for each plug adapted for attachment to a vessel containing chemical substances; an internal hollow pressure rod for each of said covers, having a transverse portion at the end thereof; said rod passing through the end portion of the piercing duct of the plug and engaging with its transverse portion, the closing cone of the stopper so that upon attachment of the cover to said plug, the stopper can be compressed by said pressure rod, thereby allowing communication with the piercing duct and the vessel containing said chemical substances.

2. The apparatus of claim 1 including a protective container to house said apparatus.

* * * * *